United States Patent [19]

Pendergraft

[11] Patent Number: 4,729,887

[45] Date of Patent: Mar. 8, 1988

[54] PROCESS AND APPARATUS FOR DEGASSING SULFUR

[75] Inventor: Paul T. Pendergraft, Tulsa, Okla.

[73] Assignee: Amoco Corporation, Chicago, Ill.

[21] Appl. No.: 766,609

[22] Filed: Aug. 16, 1985

[51] Int. Cl.[4] .......................... C01B 17/16; B01J 8/02

[52] U.S. Cl. ...................................... 423/564; 55/193; 422/160; 422/211; 422/234; 423/567 A

[58] Field of Search .................. 423/567, 578 R, 564; 422/160, 171, 211, 234; 55/53, 193, 196

[56] References Cited

U.S. PATENT DOCUMENTS

| | | | |
|---|---|---|---|
| 3,186,806 | 6/1965 | Stiles | 422/171 |
| 3,853,484 | 12/1974 | Sudar et al. | 422/171 |
| 4,111,805 | 9/1978 | Pool et al. | 423/578 R |
| 4,131,437 | 12/1978 | Campbell et al. | 423/578 R |

FOREIGN PATENT DOCUMENTS 1088276 7/1977 Canada .

OTHER PUBLICATIONS

Sulfur, No. 173, Jul.-Aug. 1984, pp. 36-37.

*Primary Examiner*—Michael S. Marcus

*Attorney, Agent, or Firm*—Gary M. Bond; L. Wayne White

[57] ABSTRACT

A process for the conversion of hydrogen polysulfide to hydrogen sulfide in liquid sulfur and removal of hydrogen sulfide from said liquid sulfur comprising a multistage process in which the sulfur is supplied to a holding zone, passed to a treatment zone where it is given multiple contact with a solid catalyst adapted to convert hydrogen polysulfide to hydrogen sulfide and removed from a third zone after treatment for hydrogen sulfide removal.

Apparatus for carrying out the method is disclosed and described.

19 Claims, 1 Drawing Figure

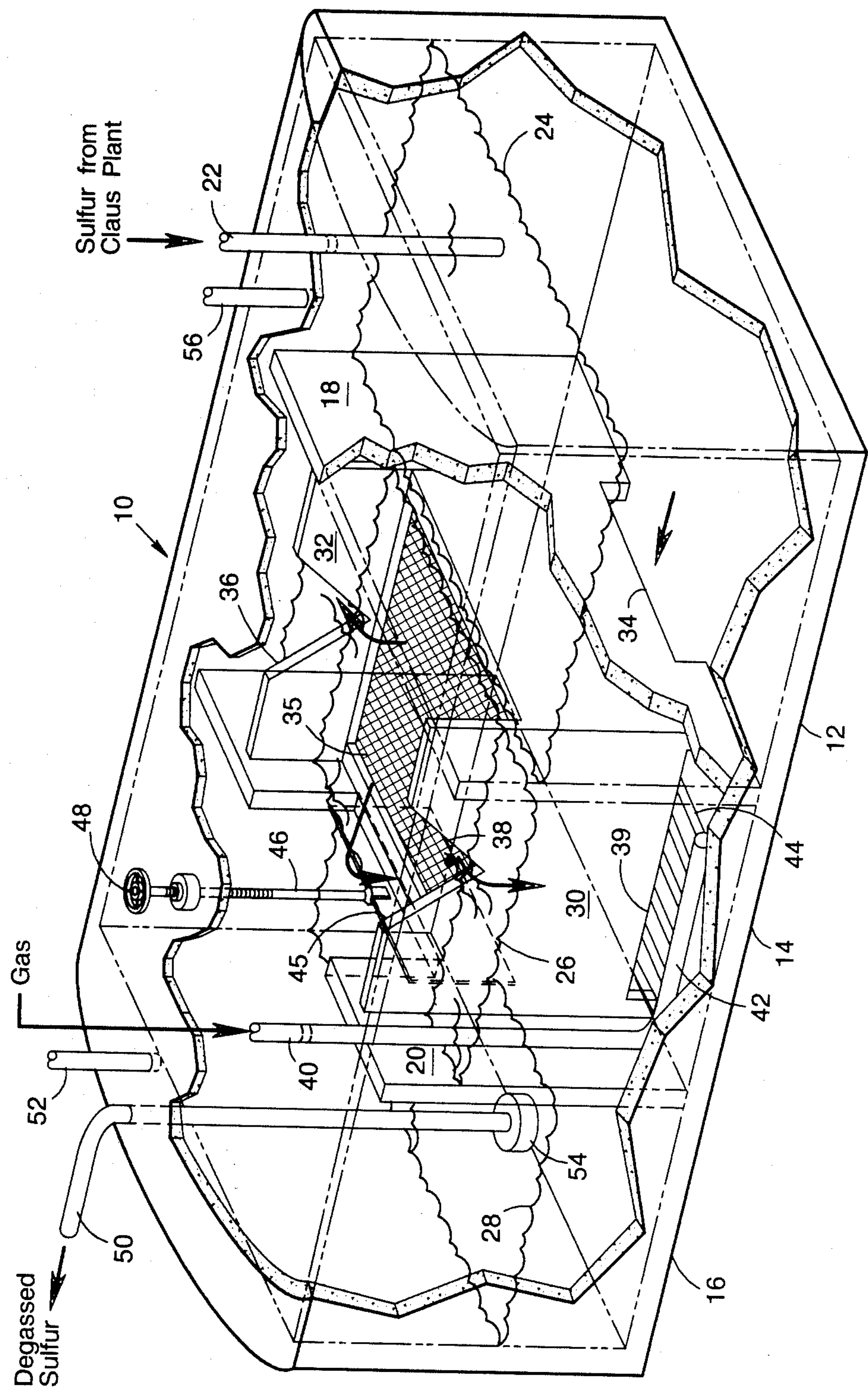
Sulfur from Claus Plant
22
56
18
24
10
32
36
34
35
12
48
46
38
39
44
45
30
26
Gas
20
42
14
40
52
54
50
28
16
Degassed Sulfur

PROCESS AND APPARATUS FOR DEGASSING SULFUR

BACKGROUND OF THE INVENTION

1. Field of the Invention

The present invention relates to an improved process for catalytic conversion of hydrogen polysulfides to hydrogen sulfide in liquid sulfur and degasification of the liquid sulfur. More specifically, it is concerned with the removal of hydrogen polysulfides and hydrogen sulfide present in liquid sulfur produced by the Claus process. A novel apparatus suitable for carrying out this process is also shown.

2. Description of the Prior Art

The toxicity and combustion hazards associated with gaseous hydrogen sulfide are well recognized and documented in the literature. Aside from being a noxious gas in relatively dilute concentrations, hydrogen sulfide becomes progessively dangerous as its concentration in a gas exceeds about 70 wppm, the fatal concentration for man being about 700 wppm. When the hydrogen sulfide content of a gas increases to at least 3.4 volume precent (which corresponds to an equilibrium value of 15 wppm hydrogen sulfide in liquid sulfur) in the presence of an oxygen containing gas such as air, the inflammability threshold of the gas will be exceeded. In addition, should liquid sulfur be confined in a vessel having iron as a material of construction, the iron sulfide formed on the inner walls thereof may be pyrophoric and in the presence of an oxygen containing gas, may result in spontaneous ignition of hydrogen sulfide without any flame or spark being present. Thus, it is desirable to maintain the concentration of hydrogen sulfide in liquid sulfur below 15 wppm.

Dissolved hydrogen sulfide is not only an absorption process. Hydrogen sulfide is known to combine with sulfur to form hydrogen polysulfides and such polysulfide formation is favored in the high temperatures associated with the Claus plant. The conversion of polysulfides back to hydrogen sulfide is an extremely slow process. Thus, the polysulfides are inherently produced in the Claus process, and once formed are extremely slow in decomposing.

Canadian Pat. No. 1088276 discloses a process for the removal of hydrogen sulfide and hydrogen polysulfide from liquid sulfur using a solid catalyst particularly suitable for the conversion of the polysulfide to hydrogen sulfide. In this process, the liquid sulfur containing the contaminants is treated with a solid degradation catalyst selected from the group consisting of alumina and cobalt-molybdenum impregnated alumina catalyst at a temperature from about 250° F. to about 320° F. while purging said liquid sulfur with an oxygen containing purge gas. The resulting hydrogen sulfide laden purge gas is separated from the liquid sulfur.

A number of multicompartment degassing processes have been disclosed in the art. Two of these, the Shell and SNEA degassing processes, are described in *Sulphur* No. 173, July-August 1984, pages 36–37, published by The British Sulphur Corporation Limited.

In the Shell system, degassing is carried out in a degassing compartment in the Claus plant collecting pit. Degassing occurs in a stripping column located in this collecting pit. While this sweep gas does remove hydrogen sulfide from the sulfur, long treating times are necessary in view of the slow conversion of hydrogen polysulfide to hydrogen sulfide.

The SNEA degassing system using two compartments with continuous circulation and spraying of the sulfur into the collecting pit through which is passed a sweep gas for hydrogen sulfide removal. In both the Shell and SNEA processes, ammonia, a well known catalyst, can be used.

A multistage degasification process for removing hydrogen sulfide from liquid sulfur is shown in Campbell, et al., U.S. Pat. No. 4,131,437 (1978) wherein the sulfur passes through a series of stages and in at least one stage, the sulfur is sprayed from a lower portion in the chamber into the purged gas space above. Air is passed through this zone for hydrogen sulfide removal. In this respect, the system is somewhat related to the SNEA process described above.

An object of this invention is to provide an improved process for the conversion of hydrogen polysulfide to hydrogen sulfide in liquid sulfur and removal of hydrogen sulfide from said liquid sulfur.

Another object is to provide apparatus for carrying out this process.

Other objects and advantages of the invention will be apparent to one skilled in the art upon reading this disclosure.

SUMMARY OF THE INVENTION

Broadly, this invention relates to a process for conversion of hydrogen polysulfide to hydrogen sulfide in liquid sulfur and removal of hydrogen sulfide from said liquid sulfur comprising passing liquid sulfur containing hydrogen sulfide and hydrogen polysulfide to the first zone of a three zone treating system, passing said liquid sulfur from said first zone to the lower portion of an adjacent second zone, said second zone being provided with a catalyst containing zone, said catalyst being effective for the conversion of hydrogen polysulfide to hydrogen sulfide and the oxidation of hydrogen sulfide to sulfur, introducing a sparging gas into the lower portion of said second zone to circulate liquid sulfur through said catalyst containing zone, passing liquid sulfur to a third zone adapted to retain liquid sulfur with a reduced hydrogen plysulfide and hydrogen sulfide content, removing liquid sulfur from said third zone, and removing hydrogen sulfide from said system.

The sparging gas moves the sulfur through the catalyst and strips hydrogen sulfide from the sulfur. Inert gases, which are suitable, include steam, carbon dioxide, nitrogen, light hydrocarbons containing up to three carbon atoms with methane being preferred, tail gas from a Claus Plant, and stack gas containing carbon dixoide, water and nitrogen. Preferred for sparging are noninert gases containing elemental oxygen or sulfur dioxide because these compounds react with hydrogen sulfide producing more sulfur and thereby providing a secondary hydrogen sulfur removal system.

The catalyst used is selected from the group consisting of alumina and cobalt-molybdenum impregnated alumina.

Further, the process can be adapted for careful control of the operation by determining the hydrogen sulfide content of the sulfur removed from said system and adjusting the amount of sulfur recirculated within the second zone in response thereto. Increase of recirculation in the second zone permits increased treatment of the sulfur with the solid catalyst in this zone for more complete hydrogen sulfide removal and hydrogen polysulfide conversion to hydrogen sulfide. Decrease or recirculation to that necessary to achieve the required degassing level will minimize the operating cost.

In another aspect, the invention relates to apparatus for carrying out this process. This includes a closed container provided with first, second, and third adjacent chambers, an inlet conduit adapted to supply liquid material to said first chamber, a catalyst bed in said second chamber positioned above the bottom thereof and spaced inwardly of the outer sidewalls thereof, a conduit extending between the lower portion of the first chamber and the lower portion of said second chamber, means to introduce a sparging gas into the area below said catalyst bed, a conduit extending between the upper portions of said second chamber and said third chamber, means to remove liquid material from said third chamber, and means to remove gas from the upper portion of at least one of said chamber. Means are provided to control the depth of liquid sulfur in the second chamber.

In view of the corrosive nature of the material being handled, acid resistant concrete is preferred for the material of construction. Aluminum, carbon steel or stainless steel should be used for piping and certain surfaces.

BRIEF DESCRIPTION OF THE DRAWING

Accompanying and forming a part of this application is a single FIGURE illustrating, in schematic form, the system used in my invention. Parts are broken away to show internal details.

PREFERRED EMBODIMENTS

Directing attention to the drawing, a complete understanding of the invention will become apparent. This drawing is provided to illustrate the fundamental steps and apparatus of the invention although those skilled in the art will recognize that additional valving, pumps, control systems, etc., will be required in commercial operation. The concrete tank, illustrated generally at 10 is shown with portions of the end wall, sidewall and cover cut away to show internal details. Sulfur pit 10 is divided into three compartments, 12, the feed compartment, 14, the catalyst treatment compartment, and 16, the sulfur holding tank. These compartments are formed by walls 18 and 20 within the pit. Sulfur is supplied by conduit 22. The sulfur level in each of the compartments is shown by line 24 in compartment 12, 26 in compartment 14 and 28 in compartment 16. Since the preferred treatment temperature is in the range of 250° F. to 280° F., steam generating coils can be provided in compartment 12 if the temperature of the incoming sulfur is much above 280° F. A broader range of temperature can be used with the catalyst, but this is the preferred range. Since the freezing point of sulfur is 238° F., a minimum of 250° F. is used for operation. The catalyst is effective up to 320° F., but the viscosity of sulfur increases at this temperature so that the upper limit of 280° F. is generally used. Two walls intermediate outer sidewalls are provided in compartment 14, these being 30 and 32. Extending between compartments 12 and 14 is a passageway 34 at the bottom of the compartment through which the sulfur containing hydrogen sulfide and hydrogen polysulfide is supplied to the catalyst contacting compartment. The catalyst compartment is provided between walls 30 and 32 designated generally as 35 with screens on the top and bottom thereof. Walls 30 and 32 are provided with V-shaped wiers 36 and 38 at the top and openings 39 at the bottom of wall 30 and a corresponding opening (not shown) in wall 32 so that the sulfur can be passed through the catalyst zone 34 and be recirculated around the outside of the catalyst basket. To obtain this circulation, air is injected through conduit 40 to sparge gas distributor manifold 42 provided with a plurality of perforated pipes 44 for the introduction of the sparging gas so that the sulfur is circulated through the catalyst bed. Wall 20 extending between compartments 14 and 16 is provided with a gate 45, the level of which is controlled by shaft 46 having control wheel 48 connected thereto. Obviously, a motorized gate could be used. This gate 45 controls the level of sulfur in compartment 14 for sufficient recirculation to permit the hydrogen sulfide reduction to the desired concentration. Sulfur which flows over into compartment 16 is removed by conduit 50 extending from a pump 54 near the bottom of compartment 16.

The sparge gas having hydrogen sulfide therein is removed to an incinerator from the upper end portion of chamber 10 through conduit 52 or conduit 56. Further, a sweep gas can be introduced in one of conduits 52 and 56 and removed from the other.

The tank is normally provided with a manhole in the cover thereof; this is not shown but will be obvious to one skilled in the art.

The following example is provided to illustrate the process and it should not be considered unduly limiting.

EXAMPLE

This example illustrates the invention wherein 100 long tons per day of sulfur containing 300 wppm hydrogen sulfide is treated to remove sufficient hydrogen sulfide so that the product contains 15 wppm of hydrogen sulfide. Hydrogen polysulfides present are considered as hydrogen sulfide since they are converted to the latter material in the treatment. In the example, this amounts to feeding 2.8 lbs/hr of hydrogen sulfide with the sulfur feed and removing 0.14 lbs/hr of hydrogen sulfide in the treated product. Air is injected through conduit 40 in an amount of 70.52 standard cubic feet per minute, this air containing 3.67 lbs/hr (1.73 wt %) water, 256.34 lbs/hr nitrogen (77.68 wt %), and 77.65 lbs oxygen (20.59%). The air passed to the incinerator by conduit 52 in an amount of 70.995 standard cubic feet per minute contains 3.67 lbs/hr water, 256,34 lbs/hr nitrogen, 77.65 lbs/hr oxygen, 2.66 lbs/hr hydrogen sulfide, and 0.15 lbs/hr sulfur vapor.

Those familiar with this operation will recognize that some of the hydrogen sulfide in the reactor is in the form of hydrogen polysulfide. Kaiser S-201 alumina, 3×6 mesh, is tha catalyst. The pressure drop across the bed is 2.43 psia and the column pressure below the bed is 17.43 psia.

To simplify this presentation, three assumptions have been made, but they do not represent a significant change from the details given. These assumptions include (1) that oxygen does not oxidize sulfur or hydrogen sulfide, (2) no Claus reaction occurs, (3) all of the hydrogen sulfide is removed by stripping only.

While the invention has been described with respect to specific compounds in a specific embodiment, it will be understood that the disclosure is intended to cover any variations, uses or adaptations of the invention as will be apparent to those skilled in the art considering the scope of the invention.

I claim:

1. A process for converting hydrogen polysulfide to hydrogen sulfide in liquid sulfur and for removing hydrogen sulfide from liquid sulfur, said process comprising:

passing liquid sulfur containing hydrogen polysulfide and hydrogen sulfide to a first zone of a three zone treating system comprising adjacent first, second, and third zones with fluid communication means between adjacent zones;

continuously passing said liquid sulfur from said first zone to a lower portion of the adjacent second zone, said second zone being provided with a catalyst containing zone, said catalyst being effective for converting hydrogen polysulfide to hydrogen sulfide and for oxidizing hydrogen sulfide to sulfur;

recirculating liquid sulfur passed through said catalyst containing zone into the lower portion of said second zone by recirculation means responsive to sulfur level, with increasing amounts of liquid sulfur being recirculated as the depth of liquid sulfur increases in said second zone;

introducing a sparging gas into the lower portion of said second zone and circulating liquid sulfur from the lower portion of said second zone through said catalyst containing zone;

continuously passing liquid sulfur with a reduced hydrogen polysulfide and hydrogen sulfide content from the second zone over an adjustable weir of variable height to the adjacent third zone, the depth of liquid sulfur in said second zone being controlled by the height of said adjustable weir and increasing as the height of said adjustable weir is increased; and removing liquid sulfur from said third zone and removing hydrogen sulfide from said treating system.

2. The process of claim 1 wherein said sparging gas contains elemental oxygen, sulfur dioxide or a mixture thereof.

3. The process of claim 1 wherein the catalyst is selected from the group consisting of alumina and cobalt-molybdenum impregnated alumina.

4. The process of claim 1 including the steps of determining the hydrogen sulfide content of the sulfur removed from said system and adjusting the amount of sulfur recirculated in the second zone in response thereto.

5. The process of claim 1 wherein the sulfur removed from the third zone contains not over 15 wppm hydrogen sulfide.

6. The process of claim 1 further including controlling recirculation of liquid sulfur in the second zone by controlling depth of liquid sulfur in the second zone, with the amount of liquid sulfur recirculated increasing as the depth of liquid sulfur in the second zone increases.

7. Apparatus for converting hydrogen polysulfide to hydrogen sulfide and liquid sulfur and for removing hydrogen sulfide from liquid sulfur, said apparatus comprising:

a closed container provided with first, second, and third adjacent chambers with fluid communication means between adjacent chambers;

fluid communication means for passing liquid sulfur containing hydrogen polysulfide and hydrogen sulfide to the first chamber;

fluid communication means for continuously passing liquid sulfur from said first chamber to a lower portion of the second chamber, said second chamber comprising means for catalytically converting hydrogen polysulfide to hydrogen sulfide and for oxidizing hydrogen sulfide to sulfur;

recirculation means responsive to sulfur level for controlling recirculation of liquid sulfur passed through said means for catalytically converting hydrogen polysulfide to the lower portion of said second chamber;

means for introducing a sparging gas into the lower portion of said second chamber, and for circulating liquid sulfur through said means for catalytically converting hydrogen polysulfide;

means for continuously passing liquid sulfur from said second chamber over an adjustable weir of variable height to the third chamber in an amount such that the liquid level in the second chamber remains essentially constant, the depth of liquid sulfur in the second chamber being controlled by the height of said adjustable weir and increasing as the height of said adjustable weir is increased;

means for removing liquid sulfur from the third chamber; and means for removing hydrogen sulfide from said container.

8. The apparatus of claim 7 wherein said second chamber comprises:

outer sidewalls, a catalyst bed in said second chamber positioned above a lower portion thereof and spaced inwardly of the outer sidewalls thereof, walls intermediate the outer sidewalls and the catalyst bed, the outer sidewalls and the walls intermediate the outer sidewalls and the catalyst bed defining a conduit for recirculating sulfur passed through the catalyst bed to the lower portion of the second chamber.

9. The apparatus of claim 7 wherein the catalyst bed comprises a catalyst selected from the group consisting of alumina and cobalt-molybdenum impregnated alumina.

10. The apparatus of claim 7 including means for controlling sulfur level in the second chamber at varying depths and thereby controlling the amount of liquid sulfur that is recirculated.

11. The apparatus of claim 7 including means to introduce a purge gas into an upper portion of at least one of said chambers.

12. The apparatus of claim 7 further comprising:

means for determining hydrogen sulfide content of sulfur for adjusting sulfur recirculated in the second zone in response thereto.

13. The apparatus of claim 7 wherein: said means for controlling recirculation of liquid sulfur in the second chamber comprises means for controlling liquid sulfur depth in the second chamber with the amount of liquid sulfur recirculated increasing as the depth of liquid sulfur in the second chamber increases.

14. A method for degassing liquid sufur which utilizes a closed container having first, second, and third adjacent chambers with fluid communication means between adjacent chambers;

the first chamber being a repository for liquid sulfur containing hydrogen sulfide and/or hydrogen polysulfide dissolved or entrained therein;

the first chamber being a repository for liquid sulfur containing hydrogen sulfide and/or hydrogen polysulfide dissolved or entrained therein;

the second chamber being a reaction zone wherein hydrogen polysulfide in the liquid sulfur is catalytically converted to gaseous hydrogen sulfide by contact with a suitable catalyst, and wherein gaseous hydrogen sulfide is separated from the treated liquid sulfur; and the third chamber being a repository for the resulting degassed liquid sulfur which has a substantially lower content of hydrogen sulfide and/or hydrogen polysulfide;

said method comprising the steps of:

(a) supplying liquid sulfur containing hydrogen sulfide and/or hydrogen polysulfide to said first chamber;

(b) continuously flowing said liquid sulfur through a fluid communication means from the first chamber to a lower portion of the second chamber below a catalyst bed contained therein;

(c) continuously injecting a sparge gas into the liquid sulfur at a lower portion of the second chamber and below the catalyst bed;

(d) concurrently flowing said liquid sulfur and sparge gas upwardly through said catalyst bed in the second chamber under conditions sufficient to convert at least a significant portion of hydrogen polysulfide to gaseous hydrogen sulfide and to thereby form (1) a treated, degassed liquid sulfur reduced in hydrogen sulfide and hydrogen polysulfide content, and (2) a gaseous mixture comprising hydrogen sulfide and sparge gas;

(e) separating the treated, degassed liquid sulfur from said gaseous mixture;

(f) venting said gaseous mixture;

(g) splitting the treated, degassed liquid sulfur into at least one stream that is recirculated to the lower portion of the second chamber, mixed with liquid sulfur flowing from the first chamber and with sparge gas, and flowed upwardly through the catalyst bed (per steps (d) and (e) above), and another stream that flows over an adjustable weir of variable height, into the third chamber; the relative amount of treated, degassed liquid sulfur that is recirculated in the second chamber being governed by the height of the adjustable weir and increasing with the height of the adjustable weir; and the amount of treated, degassed liquid sulfur flowing over the adjustable weir being controlled so that the volume of fluids being removed from the second chamber are substantially equal to the volume of liquid sulfur flowing from the first chamber to the second chamber; and (h) recovering the treated, degassed liquid sulfur from the third chamber.

15. An apparatus for degassing liquid sulfur comprising first, second, and third adjacent chambers with fluid communication means between adjacent chambers:

the first chamber being a repository for liquid sulfur having hydrogen sulfide and/or hydrogen polysulfide dissolved or entrained therein, and having an inlet means for receiving said liquid sulfur from a source thereof;

a liquid communication means for continuously passing liquid sulfur from the first chamber to a lower portion of the second chamber below a catalyst bed contained therein, which catalyst bed contains a catalyst effective for converting hydrogen polysulfide to gaseous hydrogen sulfide;

means for continuously injecting a sparge gas into the liquid sulfur at a lower portion of the second chamber below said catalyst bed;

means for flowing liquid sulfur and sparge gas upwardly through said catalyst bed;

means for separating a gaseous mixture comprising hydrogen sulfide and sparge gas from the treated liquid sulfur after passing through said catalyst bed;

means for venting said gaseous mixture;

means for splitting the treated, degassed liquid sulfur into at least one stream for recirculation within the second chamber and a stream that is passed to a third chamber over an adjustable weir of variable height;

means for recirculating said stream of said treated, degassed liquid sulfur to a lower portion of the second chamber where said portion is mixed with liquid sulfur flowing from the first chamber and with sparge gas, and then flowed upwardly through the catalyst bed;

said adjustable weir being of variable height, in fluid communication with the third chamber, and governing the relative amount of treated, liquid sulfur that is recirculated in the second chamber by the height of the adjustable weir, said relative amount of treated, liquid sulfur increasing with the height of the adjustable weir and the corresponding depth of the liquid sulfur in the second chamber;

means for controlling the stream of treated, degassed liquid sulfur that has passed over said adjustable weir so that the volume of fluids removed from the second chamber is substantially equal to the volume of liquid sulfur flowing from the first chamber to the second chamber; and means for recovering the treated, degassed liquid sulfur from the third chamber.

16. The apparatus defined by claim 15 wherein the first chamber is separated from the second chamber by a baffle having at least one opening near the bottom portion of the second chamber as a fluid communication means which permits liquid sulfur to be hydrostatically flowed from the first chamber into the second chamber.

17. The apparatus defined by claim 15 wherein the second chamber comprises an inner chamber which is positioned above the catalyst bed and which receives substantially all of the treated liquid sulfur passing upwardly through the catalyst bed column and having a spillway means and baffle with at least one weir defining the walls of said inner chamber.

18. The apparatus defined by claim 17 wherein the inner chamber has at least two V-shaped weirs in said baffles.

19. The apparatus defined by claim 18 wherein the first chamber is separated from the second chamber by a baffle having at least one opening near the bottom portion of the second chambers as a fluid communication means which permits liquid sulfur to be hydrostatically flowed from the first chamber to the second chamber.

* * * * *